United States Patent

Rayburn

[15] 3,648,132
[45] Mar. 7, 1972

[54] MULTILAYER CAPACITOR AND PROCESS FOR ADJUSTING THE VALUE THEREOF

[72] Inventor: Charles C. Rayburn, Falls Church, Va.
[73] Assignee: Illinois Tool Works Inc., Chicago, Ill.
[22] Filed: Apr. 20, 1970
[21] Appl. No.: 29,944

[52] U.S. Cl. ..........................................317/261, 29/25.42
[51] Int. Cl. ......................................H01g 3/07, H01g 3/26
[58] Field of Search......................317/261, 249 R; 29/25.42

[56] References Cited

UNITED STATES PATENTS

| | | | |
|---|---|---|---|
| 2,919,483 | 1/1960 | Gravley | 317/261 X |
| 3,235,939 | 2/1966 | Rodriguez et al. | 317/261 UX |
| 3,400,312 | 9/1968 | Dornfeld et al. | 317/249 R |
| 3,444,436 | 5/1969 | Coda | 317/261 X |
| 3,496,434 | 2/1970 | Prokopowicz | 317/261 X |

Primary Examiner—Darrell L. Clay
Attorney—Robert W. Beart, Michael Kovac, Barry L. Clark and Jack R. Halvorsen

[57] ABSTRACT

Multilayer capacitor is formed so that certain of its alternating layers of electrodes have marginal portions which terminate at an edge of the capacitor while others are located entirely internally of the capacitor so that their marginal portions are positioned short of the edge. By removing some of the dielectric material which separates the concealed electrode margins from the edge, the concealed electrodes can be electrically connected to the electrodes terminating at the edge to increase the capacitance of the capacitor. The process permits a production batch of capacitors which normally includes a great percentage of capacitors differing from a desired value by more than acceptable tolerance levels to be simply and quickly adjusted so that all, or substantially all, of the capacitors in the batch will fall within the accepted tolerance level. The adjusting is done without altering the dimensions of the capacitors or disturbing the electric field region in any manner. In one embodiment of the invention, a plurality of different sized electrode areas are formed in one plane. By removing material from the several edges of the capacitors to expose various combinations of these areas, the value of the capacitor can be varied over a large range. For example, by providing three different size electrode areas, it is possible to achieve a capacitor having capacitance values in whole number multiples of each other in a range of from one to nine capacitance units. In another modification, a conductive terminal coating connecting all electrode areas of like polarity can be removed from certain edges of the capacitor to provide selective downward adjustment of the capacitor value.

14 Claims, 23 Drawing Figures

Patented March 7, 1972

INVENTOR.
Charles C. Rayburn
BY
His Att'ys

Patented March 7, 1972　　3,648,132
2 Sheets-Sheet 2
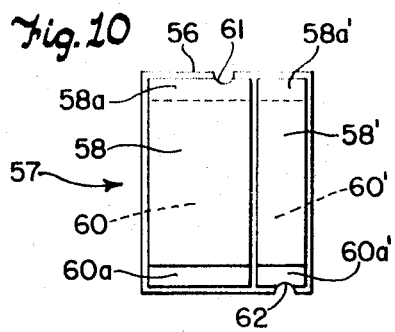
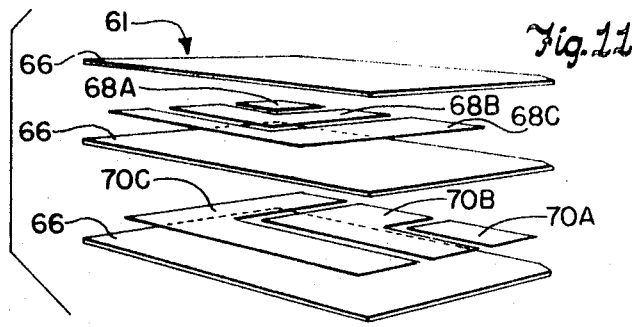
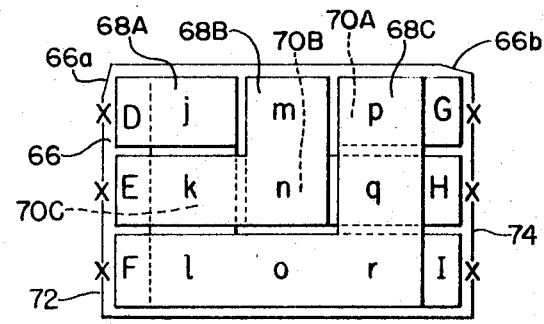
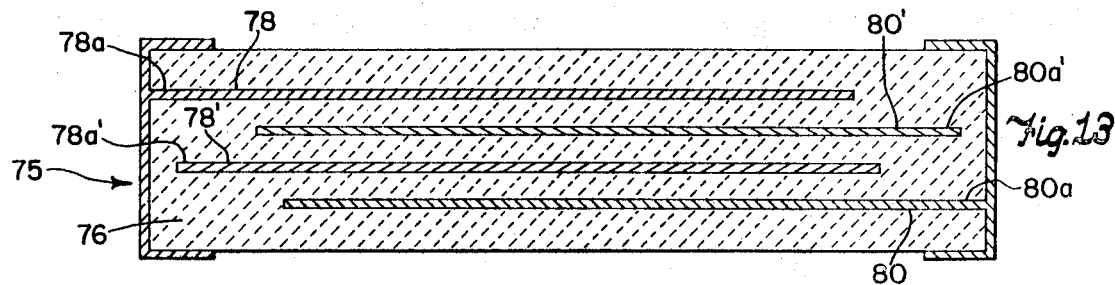
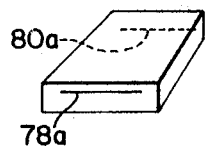
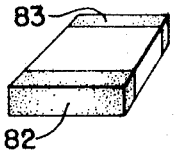
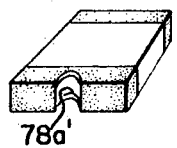
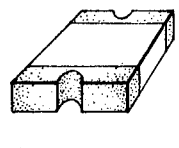
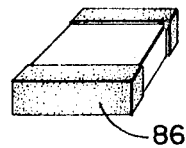
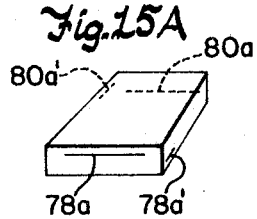
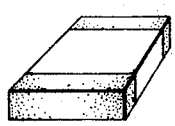
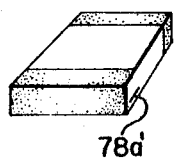
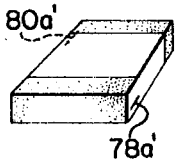
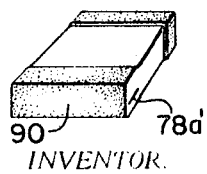
INVENTOR.
Charles C. Rayburn
BY Barry L. Clark
Michael Korse
His Att'ys

MULTILAYER CAPACITOR AND PROCESS FOR ADJUSTING THE VALUE THEREOF

BACKGROUND OF THE INVENTION

Multilayer ceramic capacitors, often referred to as chip capacitors, consist of alternate layers of ceramic dielectric which separate alternately polarized refractory metal electrodes. The structure is laminated in a "green" state and fired. The ceramic provides not only the dielectric layers but also the mechanical matrix for the electrodes and the encasement system which affords the unit its environmental protection.

Alternate layers of electrode commonly extend to opposite ends of the capacitor and are interconnected at the ends by a metal-frit mixture, usually silver-glass, which is also fired, and thereby bonded to the ends of the chip. The silver mixture on the ends not only connects each electrode layer of like polarity, but the silver provides a solderable media. Solder is commonly used to attach leads to the chips or to directly connect the chip to a circuit substrate.

The electrode layers within the chip of opposite polarity are overlapped so that each layer includes a terminal or margin portion and an electric field region which overlaps a similar region in an adjacent electrode layer of opposite polarity. The performance of the capacitor is largely established by the dielectric within the electric field region. Since it is the electric field or active region which accepts the charge, withstands the high potential gradient, and stores the energy, it follows that it is the region in which capacitance failure or degradation is most likely to occur.

A ceramic chip capacitor is produced in many dependent operations. Starting with the variable raw materials, the processes of mixing, milling, casting, printing, laminating and firing are each subject to variations. The variations are subtle and sometimes defy identification, much less control. To compound the problems, the processing time is several days. If capacitors are scheduled for specific delivery but are found to be outside the acceptable value tolerance when produced, the parts must be rescheduled, but again with the value control uncertainty. The adverse economic ramifications of this system are obvious.

One solution to compensate for processing variation, is to adjust the value of the finished chip and several systems for removing material to adjust the value of a capacitor are known to the prior art. Examples of these are shown in U.S. Pat. Nos. 2,603,737 and 2,712,172 which abrasively remove electrode material while monitoring the capacitance of the capacitor. In U.S. Pat. No. 3,235,939, multilayer capacitors are calibrated by grinding away a portion of the electric field region on a side edge of the capacitor. In U.S. Pat. No. 3,456,170, electrode material is dished out from one of the plane surfaces of the capacitor and an insulating glaze placed over the exposed electric field region. In British Patent 1,180,928, the capacitor is made so as to have a plurality of electrode areas of discrete size which are successively cut out as the capacitance is monitored.

In each of the aforementioned prior art systems, the electric field region is abraded or otherwise disturbed. In some of the prior art processes, the outer dimensions of the chip are changed during adjustment by varying amounts and result in a nonuniform product. By exposing the nascent electric field region to foreign environmental elements, the dielectric strength and insulation resistance of the capacitor are generally reduced while the dissipation factor is increased. To offset these objections somewhat, U.S. Pat. Nos. 3,456,170 and 3,394,386 propose placing a ceramic material over the exposed region and firing it. However, the possibility for damage arises when the critical electric field region is first exposed. In addition to possible deleterious effects, each of the prior art systems involve considerable processing labor and equipment which makes it quite expensive to perform an adjustment in capacitance value. Since certain of the adjustment devices require that electrical contact be made so as to monitor capacitance value during the grinding process, it is evident that the instrumentation must be very rugged to withstand the abrasive atmosphere.

SUMMARY

It is the object of the present invention to overcome the disadvantages of the downward adjustment systems of the prior art. My improved system may adjust either upwardly or downwardly in discrete adjustments but the preferred embodiment adjusts in upward discrete intervals. The advantages of my system over the prior art are that the electric field region is not disturbed, ground, blasted, patched or degraded in any manner. Furthermore, the external chip dimensions are not altered. In addition, the chip does not require electrical contacting during adjustment. A principle advantage of the system is that the adjusting process is simple, fast, and susceptible to low-cost automation.

The logic of my improved system is evident when one considers that the capacitance values of a typical production batch of multilayer ceramic chip capacitors can vary over a range by 40 percent or more, whereas, for most end uses, it is desired that the values vary no more than 10 percent on either side of a particular value. I propose applying or positioning the several layers of electrodes of the capacitors during their manufacture so that at least one layer of each polarity has the margin portion to which electrical connection is usually made to it at a position recessed within the body of the capacitor. The recessed electrodes will not initially contribute to the electric field but may be selectively activated by having their margins exposed and connected, such as by silver, to the non-recessed electrode margins. This operation will incrementally increase the value of the capacitor. If a particular capacitor is found on initial testing to be just short of being within tolerance, then its value can be increased to the proper amount by exposing one recessed electrode margin. If the value of the capacitor should be even further from its minimum allowable limit, then an additional adjustment may be made by exposing and contacting a recessed electrode margin on another edge of the capacitor.

By utilizing further embodiments of my invention, it is possible to provide capacitors whose values can be increased an entire decade by forming the capacitor so that selective contact may be made with one or more of a plurality of recessed electrodes. Such a possibility of adjustment over a large range makes it possible to manufacture and inventory only a relatively few number of different sized capacitors since a large range of capacitance values can be readily obtained by selectively removing material. Although my invention has been found to be most practical in adjusting capacitance values upwardly, it is also possible to utilize the principles of the invention to decrease the value of a capacitor in increments. This is done by providing a conductive coating such as silver on the outside of the capacitor which normally contacts several exposed but separated electrode margins. By selectively grinding away the conductive outer coating from one or more of the exposed electrode margins, a particular electrode can be effectively removed from the electric field so as to incrementally decrease the value of the capacitor. Since the conductive coating is merely removed from the edge of the margin of the electrode, it is obvious that no damage can be done to the electric field region of such a capacitor.

BRIEF DESCRIPTION OF THE DRAWINGS

FIG. 10 is a top plan view of a modified form of capacitor with the upper ceramic layers omitted for clarity;

FIGS. 11 and 12 are an exploded perspective view and a top plan view, respectively, of an arrangement incorporating separate coplanar electrode areas which permit capacitors to be made having any whole number value between one and nine units;

FIG. 13 is a side cross-sectional view similar to FIG. 2 showing a modified form of capacitor which may have its value adjusted in several whole number multiples by varying the effective dielectric thickness;

FIGS. 14A–14E are perspective views illustrating how the capacitor of FIG. 13 can be adjusted to provide one, three or nine units of capacitance; and FIGS. 15A–15E are perspective views illustrating a modification of the invention wherein a capacitor formed internally as in FIG. 13, can be adjusted downwardly in value from nine units of capacitance to either three units or one unit.

DESCRIPTION OF THE PREFERRED EMBODIMENTS

Figure 1:
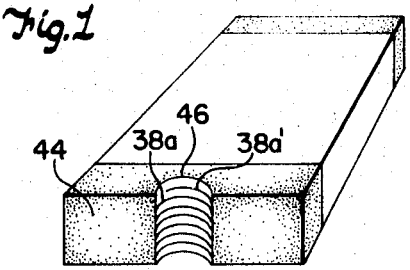
FIG. 1 is a perspective view of a chip capacitor in accordance with my invention showing the outer edge notched to expose a recessed electrode.

FIGS. 3–6 illustrate a conventionally constructed prior art multilayer ceramic capacitor 10 and two ways known to the prior art for adjusting the value thereof by decreasing it. Multilayer ceramic capacitors are made by stacking together alternate layers of ceramic and electrode material. Generally, each ceramic layer 12 has printed upon it, such as by silk screening, an electrode layer in the form of a refractory metal paste such as that of platinum which will withstand the very high firing temperatures required for the ceramic. Except for the upper and lower outer layers of the capacitor which protect and seal the electrodes inside the capacitor, the remaining internal ceramic layers 12 are alternately printed with electrodes 14 terminating at one end 15 of the capacitor and electrode layers 16 which terminate at the opposite end 17 of the capacitor. The electrodes 14 include a marginal portion 14a and an electric field portion 14b. Similarly, each electrode 16 includes a marginal portion 16a and an electric field portion 16b. It is the overlapping areas 14b, 16b of adjacent electrodes of opposite polarity that provide the electric field of the capacitors. The marginal portions 14a, 16a are not in the electric field, and merely extend to the ends 15, 17 of the capacitor wherein they are electrically connected together by an external coating (not shown) of a metal-frit mixture such as silver-glass, which is usually fired (at a lower temperature than required for the ceramic) so as to become bonded to the marginal ends 14a, 16a respectively of the electrodes.

Figure 4:
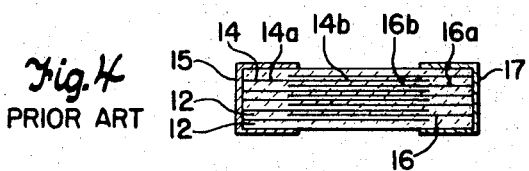
FIG. 4 is a side sectional view similar to FIG. 2 but showing the prior art capacitor of FIG. 3 taken along line 4—4 of FIG. 3.
Figure 3:
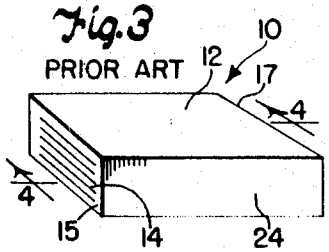
FIG. 3 is a perspective view of a conventional prior art multilayer chip capacitor.
Figure 5:
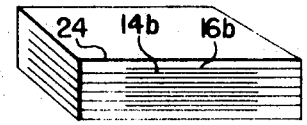
FIG. 5 is a perspective view of a prior art capacitor of the type shown in FIG. 3 wherein a portion of a side edge of the capacitor has been removed to decrease the capacitance value thereof.

As can be seen in FIGS. 3 and 4, the electric field portions 14b, 16b of the electrodes 14, 16 are completely encased and protected by the ceramic layers 12. In order to adjust the value of such a capacitor, it is necessary to remove material from the electric field. This adjustment can be done as shown in FIG. 5 by grinding away a side edge 24 of the capacitor while monitoring (not shown) the capacitance thereof. It will be readily appreciated that such grinding exposes the electric field region between electrode portions 14b, 16b and subjects it to contamination. Contamination can arise even though the exposed layers are sealed over such as by applying glass to them. Edge grinding, as shown in FIG. 5, also presents the problem of possible smearing of the closely spaced electrodes 14, 16 of opposite polarity against each other so as to produce shorts.

Figure 6:
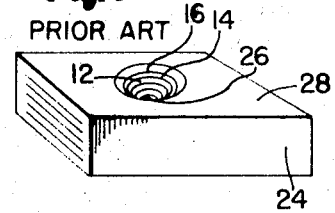
FIG. 6 is a perspective view of a prior art capacitor of the type shown in FIG. 3 wherein the capacitance has been decreased by abrading a crater in the top surface of the capacitor.

The method of adjusting illustrated in FIG. 6 is superior to that shown in FIG. 5 since the length and width dimensions of the capacitor are unaltered. Furthermore, the crater-shaped opening 26 which is formed by cutting through the electrodes 14, 16 on an angle provides a greater separation between electrodes and thus eliminates any possibility of electrode smearing. However, even this method of adjustment provides degradation problems with the exposed electric field region. In addition, it requires much labor and equipment to individually monitor and blast each chip as well as tedious hand labor to carefully fill each crater with glass.

Figure 2:
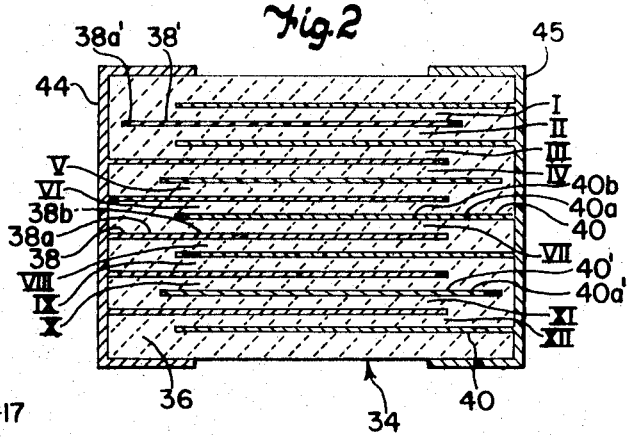
FIG. 2 is a side sectional view of the capacitor shown in FIG. 1 taken along line 2—2 of FIG. 1.
Figure 7:
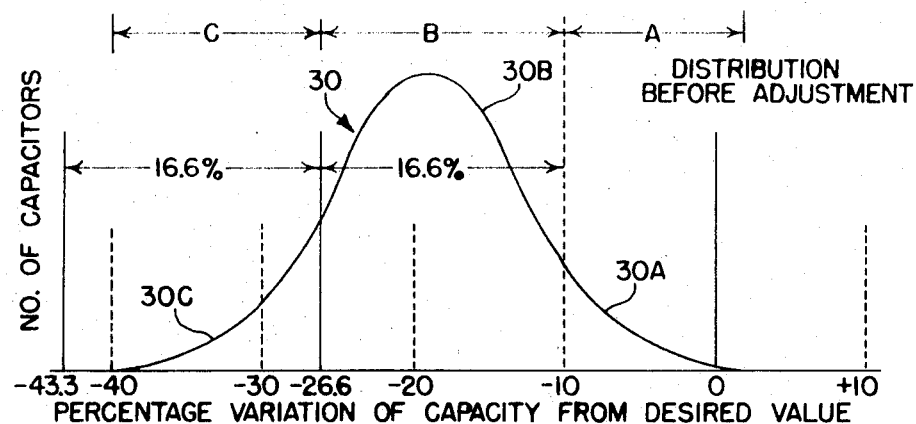
FIG. 7 is a graphical representation showing a typical population-value distribution curve for a batch of capacitors made in accordance with my invention before any value adjustments are made.
Figure 8:
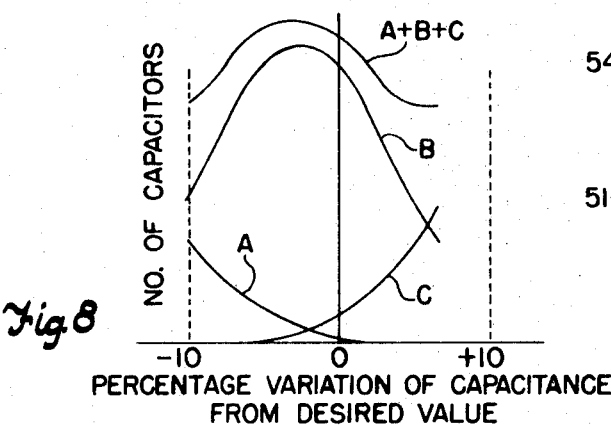
FIG. 8 is a graphical representation similar to FIG. 7, both showing how all of the capacitors in the batch represented by FIG. 7 before adjustment may be adjusted to fall within a region of small variation in tolerance.

My improved method of adjusting not only eliminates the problems of the prior art methods of adjusting, but also greatly increases the yield from a given batch of capacitors. In FIG. 7, the curve 30B represents a typical population-value distribution curve prior to adjustment for a batch of multilayer capacitors 34 having an internal configuration as shown in FIG. 2. As can be seen, the values of capacitance vary from approximately minus 40 to plus 2 percent of the nominal value, whereas the desired capacitance range for this example is the nominal value ("0" on the graph) plus and minus 10 percent. The distribution has been deliberately targeted below the desired nominal value of "0" to accommodate my upward adjustment system. The parts in population A in FIG. 7 are within the desired tolerance limits and are not adjusted. The parts in population B require one discrete adjustment in a manner to be hereinafter explained so as to fall within the desired value range. Similarly, the parts in population C require two adjustments. In FIG. 8 the three populations A, B, and C are shown after adjustment. This figure also shows a composite population distribution curve which is referenced as "A+B+C". From an analysis of the curves in FIGS. 7 and 8, one can readily appreciate that my adjustment system permits all of the capacitors in a manufactured batch to be adjusted to fall within desired tolerance limits.

FIG. 2 shows the cross section of a capacitor 34 of the type included in the FIG. 7 distribution. The ceramic layers 36 form dielectric layers I–XII which may be energized, each dielectric layer contributing approximately 8⅓ percent of the maximum final capacitance. Electrodes 38' and 40' have been displaced slightly from electrodes 38 and 40 so as to be about 0.007 inches recessed in the dielectric 36 from the silver terminal surfaces 44, 45. In order to connect the recessed electrode 38' so as to add it to the electric field, a pass may be made with an abrasive grinding wheel (not shown) to provide the cut groove 46 shown in FIG. 1. After the electrode 38' is exposed by the cut 46, the capacitor is then resilvered to electrically connect electrode 38' to the silvered surface 44 and thus to electrodes 38, causing dielectric layers I and II (previously out of the electric field) to become energized when a potential is applied. The adding of the two dielectric layers I and II increase the value of the capacitor by approximately 16⅔ percent of the maximum final capacitance. The parts in FIG. 7, population B, received this one adjustment to move to the position shown in FIG. 8.

The parts in FIG. 7, population C, are selected for two adjustments. In a manner as described above for electrode 38', electrode 40' is also connected to its adjacent electrodes through silvered terminal surface 45. This connection causes the dielectric layers X and XI to become energized when a potential is applied.

If an outer electrode such as the lower most electrode 40 in FIG. 2 is recessed from the end edge for adjustment, its connection will result in only one-half the capacitance increase as compared to the connection of electrode 38' or 40', since only one dielectric layer is stressed, specifically, layer XII.

Figure 9:
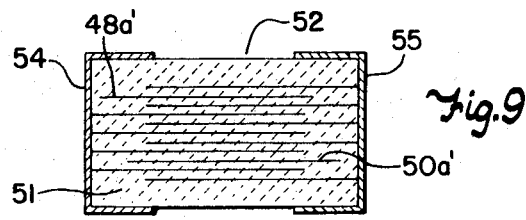
FIG. 9 is a top plan view of an additional modification of the capacitor shown in FIG. 1 which can have its value adjusted in one or two increments by being tumble milled for varying time periods.

Although FIG. 1 shows a narrow groove 46 in the end of the capacitor such as could be produced by an abrasive grinding wheel, such a method of exposing a recessed electrode should not be construed as limiting. For example, the entire end edge of the capacitor could be lapped or ground to expose the recessed electrode. Or, the abrasive wheel could be used to make only a partial vertical cut to expose the electrode 38a', rather than making the completed through cut as shown. An alternative method of exposing the recessed electrodes is by abrasive tumble milling. This method requires that the ceramic walls surrounding the electric field region are sufficiently thick to avoid exposure of the active region as the ceramic 51 is worn down in thickness. In this tumble milling adjustment process, the electrode 50a' on one end of the capacitor 52 (see FIG. 9) is recessed more than the recessed electrode 48a' on the other end. This permits the adjustment steps to be time dependent, allowing one or both recessed electrodes to be exposed as desired, depending on the milling time. Obviously, after the tumbling is completed and the recessed electrodes 48a' and 50a' are exposed by a wearing away of the ceramic material 46, the silver terminal surfaces 54, 55 must again, of course, be applied to the capacitor.

Although for simplicity in explaining my invention, only one electrode has been shown as being recessed at each end of the capacitor, it is obvious that more than one could be recessed, depending upon the desired increment of adjustment and the number of potentially active dielectric layers.

One particularly important feature of my adjustment system is its ability to utilize high-speed sorting and silvering equipment which is commercially available. The fact that capacitors can be sorted automatically at rates of several thousand per hour by automatic testing devices such as the Model AT 30 sold by K. Dixon Corporation of Tarzana, California, considerably reduces the processing time and equipment investment. The value of the system is even more significant when one considers that devices for sorting by value, as well as terminal metallizing facilities, are necessary and existing parts of a chip capacitor production line. A particularly useful device for orienting and feeding chip capacitors is disclosed in U.S. Pat. application Ser. No. 706,010 filed Feb. 16, 1968.

FIG. 10 is a plan view of the interior of a modified form of capacitor 57, with the top ceramic cover layers removed for purposes of illustration, which provides for four adjustments per chip. The capacitor 57 includes a layer of ceramic 56 having electrodes 58 and 58' on its upper surface and electrodes 60 and 60' in engagement with its undersurface. A connection may selectively be made to the terminal portions of the electrodes, namely portions 58a, and 58a' which are in the upper plane or 60a, 60a' which are in the lower plane. Depending upon how much capacitance is desired, the outer edge of the ceramic layer 56 can be notched such as shown at 61, 62. The recessed electrodes 58, 58', 60 and 60', may be the only recessed electrodes in a large stack so as to provide minor adjustment possibilities, or, the capacitor could be formed so that all of the electrodes are recessed if a large amount of adjustment is desired. The use of multiple pattern electrodes as in FIG. 10, is especially desirable when producing a capacitor with few electrode layers and high dielectric constant in order to reduce the cost of the refractory electrode metal.

In FIGS. 11 and 12, a modified adjustment system is shown wherein the capacitor 61 has variable sized electrode areas 68A, 68B and 68C, in one plane, and similarly sized areas 70A, 70B, and 70C in a second plane separated from the first by a dielectric layer of ceramic 66. The particular electrode pattern shown wherein the electric field regions have an area relationship to each other of 1:3:5 permits adjustment of capacitance upwardly through one entire decade. Electrode terminal portions D, E, and F in the first plane, and G, H and I in the second plane, connect the respective electric field areas j-r in FIG. 12. All of the electrode contacts D,E,F, G, H and I are recessed within the ceramic material 66. The ceramic 66 is covered at one end with a silver terminal 72 and at the other end with a silver terminal 74. In order to activate any particular electric field region, a notch can be ground in the ceramic 66 at each end of the capacitor at one or more of the positions noted by the symbol "X." Referring to FIG. 12, it can be seen that exposing contacts D and I will activate electric field area j. Similarly, exposing contacts E and H will activate electric field areas m and n. The capacitance obtained from grinding any particular set of points "X" is shown in the following table:

| Capacitance Units | Grind |
| --- | --- |
| 0 | 0 |
| 1 | D, I |
| 2 | E, H |
| 3 | F, I |
| 4 | E, F, I |
| 5 | D, E, F, I |
| 6 | D, E, F, G, I |
| 7 | E,F,H,I |
| 8 | D,E,F,H,I |
| 9 | D,E,F,G,H,I |

Since the electrodes in the capacitor 61 shown in FIGS. 11 and 12 are recessed from the edges, some means must be provided to enable the capacitor to be correctly oriented so that the correct terminal can be exposed. This can conveniently be done by cutting off two corners of the chip in an asymmetric manner such as shown at 66a, 66b.

The variable sized area form of electrode positioning arrangement of FIGS. 11 and 12 permits chips to be manufactured and stocked in a limited number of sizes and then adjusted to value on demand to reduce processing time. The particular electrode configuration shown can also be added to a capacitor stack as a means to provide a slight degree of adjustment wherein the remaining electrodes are always in the electric field.

FIG. 13 shows a cross section of a capacitor 75 having four electrodes 78, 78', 80, and 80' which may be utilized in the adjustment system shown in FIGS. 14A–14E and 15A–15E. The capacitor 75 is adjusted by varying dielectric thickness as compared to capacitor 61 in FIGS. 11 and 12 which is adjusted by varying electrode areas.

In FIGS. 14A–14E, a method of providing discrete upward adjustments by connecting electrodes to effectively decrease dielectric thickness and thereby increase capacitance is shown. For example, in FIG. 14A, electrode terminal portions 78a and 80a are exposed while terminal portions 80a' and 78a' are recessed (see FIG. 13). After coatings of silver 82, 83 are applied to the ends and are silvered as shown in FIG. 14B, the capacitor will possess one unit of capacitance. As can be seen from FIG. 13, such a connection of terminals will subject all three dielectric layers to the electric field. By grinding a cut as shown in FIG. 14C, electrode terminal 78a' is exposed. After silvering, the value of the capacitor will increase to three units of capacitance because the dielectric thickness to which the electric field is subjected has been reduced to that spacing between electrodes 78' and 80a. By grinding a second cut as shown in FIG. 14D, electrode 80a' is exposed. After resilvering, the capacitance will increase to nine units because each of the three layers is being stressed under the influence of the full potential. Thus, with two adjustments, a 9:1 value ratio results. In FIG. 14E, the capacitor is shown as having had a solder coating 86 applied to it which effectively obscures the adjusting notches.

FIGS. 15A–15E describe a discrete adjustment system which adjusts downwardly. The electrode terminals 78a and 80a of FIG. 13 are arranged to emerge from the end edge surfaces of the chip in the manner shown in FIG. 15A while terminals 78a' and 80a' emerge from the side edges. FIG. 15B shows each of the exposed electrodes connected by a silver coating 82 so as to yield a capacitance value of nine units. In FIG. 15C, it can be seen that grinding the silver away from electrode 78a' reduces the capacitance to one-third of its original value of three units. In FIG. 15D, a second grinding away of silver to expose electrode 80a', reduces the capacitance to one-ninth of its original value or to one unit. FIG. 15E shows the finished chip after a solder coating 90 has been applied to it.

I claim:

1. A multilayer capacitor comprising:
a first set of electrode layers;
a second set of electrode layers in partially overlapping relation with and separated from said first set by layers of dielectric material,
terminal portions of each of said first and second sets of electrodes being in nonoverlapping relation and extending toward first and second edges of said capacitor;
at least one terminal portion of one of said first and second sets extending toward its respective edge to a lesser extent than others of the terminal portions in said one of said sets.

2. A capacitor as defined in claim 1 wherein certain of the terminal portions of at least one of said sets of electrodes terminate in a plane of one of the edges of said capacitor while said at least one terminal portion terminates short of said one edge and is separated from it by dielectric material.

3. A capacitor as defined in claim 2 wherein said plane of one of said edges is notched sufficiently deeply to intersect said at least one terminal portion and permit an external conductive coating which is applied thereto to electrically connect all of the terminal portions in one of said sets of electrodes.

4. A capacitor as defined in claim 1 wherein each of said first and second sets of electrode layers has certain terminal portions terminating in a plane at first and second edges, respectively, of said capacitor, said capacitor having at least one additional terminal portion in each of said first and second sets of electrodes which terminates short of said first and second edges and is separated therefrom by dielectric material.

5. A capacitor as defined in claim 4 wherein said at least one additional terminal portion in each of said first and second sets of electrodes terminates at different distances from said first and second edges.

6. A capacitor as defined in claim 1 wherein said capacitor includes a plurality of sets of partially overlapping electrodes with certain of the terminal portions of each set terminating in common planes on the edges of the capacitor and with at least one terminal portion of each set terminating short of one of said common planes and spaced from it by a thickness of dielectric material, and a notch in at least one of said edges having a depth greater than the thickness of said dielectric material for permitting a conductive coating applied to said at least one edge to electrically connect all of the terminal portions in the notched set of electrodes.

7. An adjustable multilayer capacitor comprising a plurality of spaced electrode areas of like polarity in a first plane on one side of a dielectric member and a plurality of spaced electrode areas of like but opposite polarity in a second plane on the opposite side of said dielectric member, each of said spaced electrode areas in said first plane having common areas of overlap with one of said electrode areas in said second plane as well as areas of nonoverlap forming terminal portions defining a plurality of separate electric field areas, at least one of said plurality of electrode areas in one of said planes being spaced immediately inwardly from the terminal portion of electrode areas of like polarity so that said one of said plurality of electrode areas is selectively connectable to said terminal portion of said electrode areas of like polarity by a conductive coating upon removal of selected areas of said dielectric material.

8. A process for adjusting the value of a multilayer capacitor comprising the steps of:
stacking and bonding together layers of electrodes of opposed polarity which are spaced from each other by dielectric material;
positioning at least two electrode layers of like polarity with their terminals edge spaced from each other and at least one of which is spaced inwardly from the same edge of the remaining layer of said at least two layers of like polarity electrodes so that an external conductive coating applied to one end of the capacitor can be selectively connected to one or both of the edges of said at least two electrode layers of like polarity upon sufficient removal of said dielectric material to expose the inwardly spaced terminal of said one terminal.

9. A process for upwardly adjusting the value of a multilayer ceramic capacitor comprising the steps of:
stacking together a plurality of layers of ceramic having electrode patterns thereon, the terminal portions of the electrodes in adjacent layers being in spaced, nonoverlapping relation to each other;
providing dielectric material between the outer extremities of at least some of said terminal portions and the outer edges of said capacitor providing recessed terminals while exposing other terminal portions to the outer edge of the capacitor;
firing said capacitor to vitrify said ceramic;
selectively removing dielectric material from at least one of said outer edges exposing the outer extremity of at least one of said recessed terminal portions; and
applying a conductive coating to said at least one outer edge to permit electrical connection to be made thereto.

10. A process in accordance with claim 9 wherein the stacking step comprises stacking a plurality of ceramic layers having electrode terminal portions facing in one direction in alternating relation to a plurality of ceramic layers having electrode terminal portions facing in a second direction, and positioning certain of said electrode terminal portions so they extend to the edges of said capacitor, said process including the additional steps of applying a conductive coating to said other terminal portions which extend to said edges, measuring the value of said capacitor as determined by the electrodes extending to said edges, and utilizing the measured value to control the number of outer edges from which dielectric material is removed in order to incrementally increase the value of the capacitor.

11. A process for producing a batch of ceramic multilayer capacitors which normally results in a distribution of capacitance value over a large range in such a manner as to cause substantially all of the capacitors in the batch to have capacitance values in a much smaller range, said process including the steps of:
providing a sufficient number of electrode areas in the capacitors that the omission of at least one of them from the electric field of all of the capacitors in the batch by having its terminal portion recessed in the capacitor relative to other terminal portions at one edge of the capacitor will result in the value distribution for the entire batch to be either less than the desired negative tolerance or no greater than the desired positive tolerance;
measuring the values of the capacitors in the batch and sorting them to segregate those whose value is below the desired tolerance;
removing dielectric material from the said one edge of those capacitors which are below the desired tolerance to expose the recessed terminal portion of said at least one electrode area; and
applying a conductive coating to the said one edge to electrically connect said recessed terminal portion to the terminal portions already connected to each other at said edge so as to increase the number of electrodes in the electric field; each capacitor being provided with a plurality of electrode areas that have their terminal portions recessed beneath a plurality of edges so that the value of any particular capacitor in the batch can have its value increased in several increments by removing dielectric material from more than one edge so as to expose the recessed terminal portions of a plurality of electrode areas; and wherein said recessed terminal portions are recessed to varying amounts.

12. A process in accordance with claim 11 wherein said dielectric material is removed by tumble milling said capacitors, the length of tumbling time determining how many recessed terminal portions are exposed.

13. A process for downwardly adjusting the value of a multilayer ceramic capacitor comprising the steps of:

stacking together a plurality of layers of ceramic having overlapping electrode patterns thereon so that the terminal portions of at least three layers extend to spaced-apart edge portions of said capacitor, applying a conductive coating to said edges to join at least some of said spaced-apart terminal portions, and selectively removing the conductive coating from at least one of said terminal portions to remove the electrode integral therewith from the electric field of the capacitor.

14. An adjustable multilayer capacitor comprising a plurality of electrode layers separated from each other by dielectric material, adjacent electrode layers having overlapping and nonoverlapping areas, the nonoverlapping areas extending to different side edges of said capacitor forming terminal portions of electrodes of opposite polarity, and at least one electrode layer in said capacitor being recessed from the side edge of one of said terminal portions in said dielectric material, and said capacitor having a recess extending through said dielectric material exposing said one electrode layer for selective connection to said one of said terminal portions.

* * * * *